United States Patent [19]

Dalton et al.

[11] 4,078,440
[45] Mar. 14, 1978

[54] VALVE ACTUATOR

[75] Inventors: Thomas B. Dalton; Gary D. Counselor, both of Muskegon, Mich.

[73] Assignee: Westran Corporation, Muskegon, Mich.

[21] Appl. No.: 652,565

[22] Filed: Jan. 26, 1976

[51] Int. Cl.² .............................................. F16H 27/02
[52] U.S. Cl. ............................ 74/89.15; 74/424.8 VA
[58] Field of Search .................... 74/424.8 VA, 424.8, 74/89.15, 300

[56] References Cited

U.S. PATENT DOCUMENTS

| 2,845,814 | 8/1958 | Milleville | 74/424.8 VA |
| 2,964,961 | 12/1960 | Gulick | 74/424.8 VA |
| 3,949,626 | 4/1976 | Berlinger et al. | 74/424.8 VA |

*Primary Examiner*—Samuel Scott
*Assistant Examiner*—Wesley S. Ratliff, Jr.
*Attorney, Agent, or Firm*—Gifford, Chandler, Sheridan & Sprinkle

[57] ABSTRACT

A valve actuator is provided for use in conjunction with a valve having a rotatable member wherein rotation of the rotatable member selectively actuates the valve in accordance with the direction of rotation of the rotatable member. The valve may be of the "rising valve stem" type in which the rotatable member threadably engages the valve stem to axially shift the valve stem upon actuation of the valve. The valve actuator comprises a nut adapter secured to the rotatable member in combination with actuating means contained in a housing.

The actuator means further comprises a drive tube which lockingly engages the nut adapter by means of inwardly projecting indentations formed axially along the drive tube which are received in axial grooves formed along the periphery of the nut adapter. In addition, the drive tube is coaxial with the valve stem so as to permit the valve stem to be received axially through the drive tube upon valve actuation. The drive tube is rotatably mounted and includes a drive gear secured thereto so that rotation of the drive gear effects a similar rotation of the nut adapter through the drive tube. A bevel gear arrangement, operable in response to the rotation of a crankshaft, meshingly engages and cooperates with the drive gear to effect the rotation thereof wherein the axis rotation of the crankshaft is radially spaced from the axis of the valve.

6 Claims, 5 Drawing Figures

VALVE ACTUATOR

BACKGROUND OF THE INVENTION

I. Field of the Invention

The present invention relates generally to valve actuators, and more particularly, to a novel drive engagement between the valve actuator and a valve rotatable member wherein the axis of rotation of the actuator is offset from the axis of rotation of the rotatable member.

II. Description of the Prior Art

There are a wide variety of different types of valves used throughout industry, and likewise, a plurality of previously known valve actuators for each of the different types of valves. In the "rising stem" type of valve, which is commonly used as an oil pipeline valve or the like, a rotatable member threadably engages an elongated valve stem. The rotatable member is fixed against axial movement, while conversely, the valve stem is fixed against rotational movement so that rotation of the rotatable member axially moves the valve stem to actuate the valve.

In order to actuate the so called "rising stem" valves, it has been the previous practice to connect a hand wheel, crank or the like to the rotatable member in order to effect rotation thereof. These valve actuators, however, have proven disadvantageous in that the valve stem is subjected to wear and tear from the natural elements, and even to vandalism. Moreover, it has been found that repeated attachment and removal of the actuating wheel tends to damage the valve stem as the hand actuators bang against the valve stem due to carelessness of the workmen. Lastly, since the valve stem moves axially through the center of the hand wheel, the valve stem itself tends to interfere with the natural cranking action of the workmen.

In order to solve these difficulties, more complex valve actuators have been devised in which a gear arrangement is provided for drivingly engaging the rotatable member and wherein the valve stem is received in an elongated recess. These previously known valve actuators, however, have also proven disadvantageous in several ways. First, since the axial travel of the valve stems varies from one valve to another, it has been the previous practice to produce an entire line of valve actuators having different sizes of elongated recesses for receiving the valve stems but which are otherwise substantially identical. This necessity of manufacturing or stocking a line of actuators unnecessarily increases the tooling and warehousing costs for the valve actuators.

A still further disadvantage of these previously known valve actuators is that the valve actuators are unnecessarily complex and require extensive tooling during their production, which of course, increases the costs of the actuator. In particular, many previously known valve actuators utilize an interdigital clutch mechanism between the actuator and the valve rotatable member for drivingly engaging the same. The previously known interdigital clutch is not only expensive to manufacture, but is also prone to failure. Moreover, many of these previously known valve actuators require extensive modifications of the valve which is not only expensive but oftentimes impractical, particularly when the valve is already installed in the field.

SUMMARY OF THE PRESENT INVENTION

The valve actuator of the present invention overcomes the above mentioned disadvantages of the previously known valve actuators by providing an actuator for rotatably driving the valve rotatable member wherein the axis of rotation for the actuator is offset from the valve stem axis. The actuator comprises a housing and a receiving tube secured adjacent to the actuator housing and coaxial with the valve stem so that the valve stem is received in the receiving tube. Thus any length of valve stem travel may be accommodated by coupling extensions to the receiving tube. In this manner, the actuator of the present invention will accommodate all valves regardless of valve stem travel without the necessity of producing an entire production line of valve actuators.

Furthermore, as will become apparent, the driving engagement between the actuator of the present invention and the valve rotatable member is of a simple construction which is not only relatively inexpensive to manufacture but also protects the threads on the valve stem from damage. In brief, a nut adapter having a pair of diametrically opposed axial grooves formed on its periphery is secured to the rotatable member in any conventional fashion. A rotatably mounted drive tube having a pair of diametrically opposed elongated inwardly projecting indentations is positioned coaxially with the valve stem and nut adapter and the indentations are of such a cross-sectional shape that they are received within the grooves formed on the nut adapter so that rotation of the drive tube effects a like rotation of the adapter. At the other end of the drive tube, the indentations provide the locking engagement between the drive tube and a coaxial drive gear.

A bevel gear arrangement having a crankshaft with an axis offset from the axis of the drive tube cooperates with the drive gear so that rotation of the crankshaft effects rotation of the drive gear. Any conventional means, such as a hand wheel, is secured to the crankshaft to effect the rotation thereof.

BRIEF DESCRIPTION OF THE DRAWING

A better understanding of the valve actuator of the present invention will be had upon reference to the following detailed description when read in conjunction with the accompanying drawing, wherein like reference characters refer to like parts throughout the several views, and in which:

FIG. 4 is a cross-sectional view taken substantially along line 4—4 in FIG. 2; and FIG. 5 is a fragmentary cross-sectional view showing the nut adapter of the present invention installed upon a valve and with parts broken away for clarity.

DETAILED DESCRIPTION OF THE PRESENT INVENTION

Figure 1:
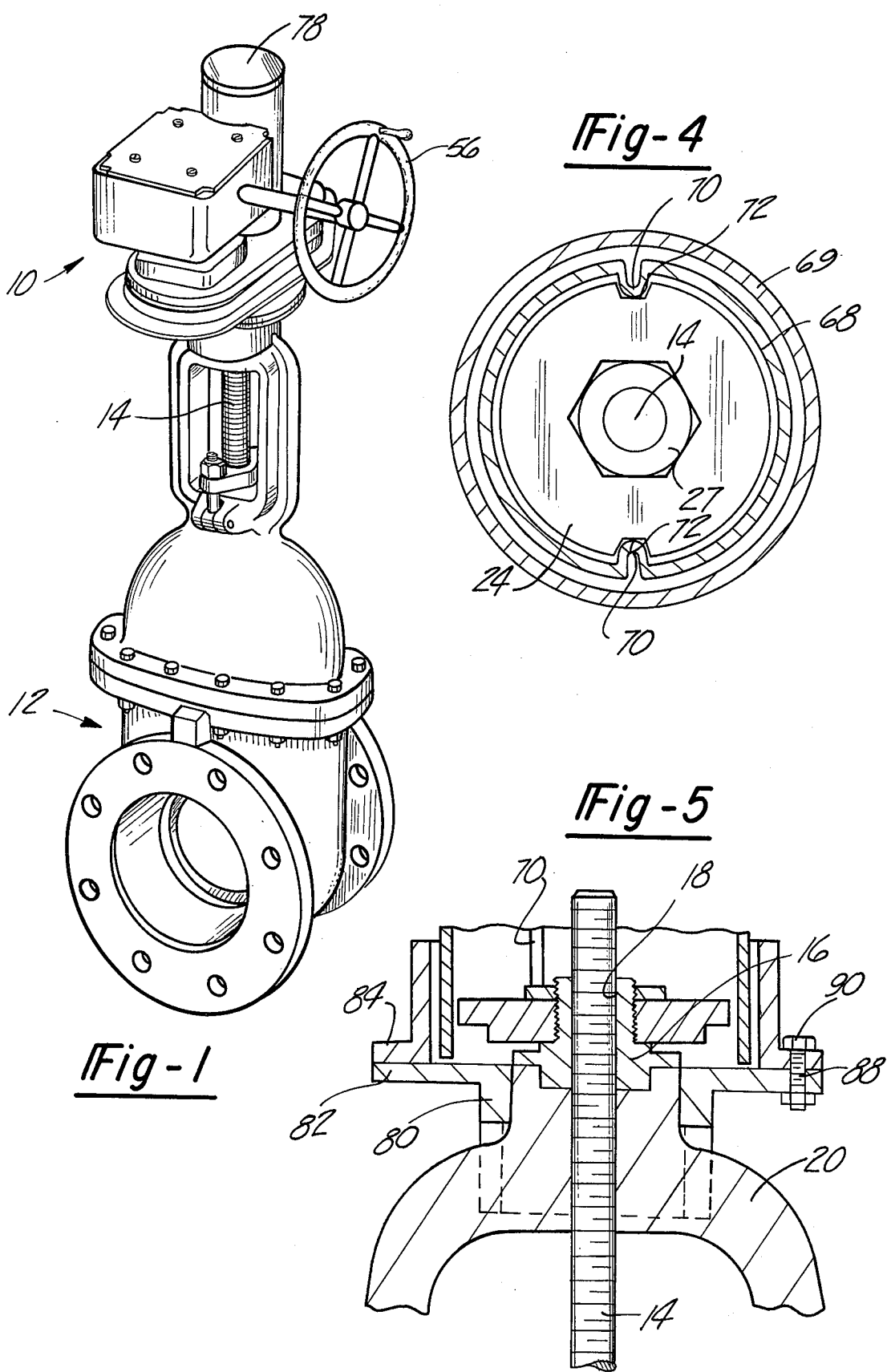
FIG. 1 is a perspective view showing the valve actuator of the present invention installed on a valve.

Referring first to FIGS. 1 and 5, a preferred valve actuator assembly 10 is thereshown installed upon and adapted to actuate a valve 12. The valve 12, illustrated in FIG. 1 as a pipeline valve, is intended for purposes of illustration only and as will become shortly apparent, the actuator assembly 10 is readily adaptable to a wide variety of different kinds of valves 12. As shown, however, the valve 12 comprises an elongated valve stem 14 which is threadably received through a rotatable member 16 having internal threads 18. The rotatable member 16 is secured against axial movement by any conventional means to a yoke 20 and the valve stem 14 is secured against rotation by means (not shown) at its lower end. Consequently, rotation of the rotatable member 16 effects an axial displacement of the valve stem 14 which opens or closes the valve 12 in the conventional manner.

Figure 2:
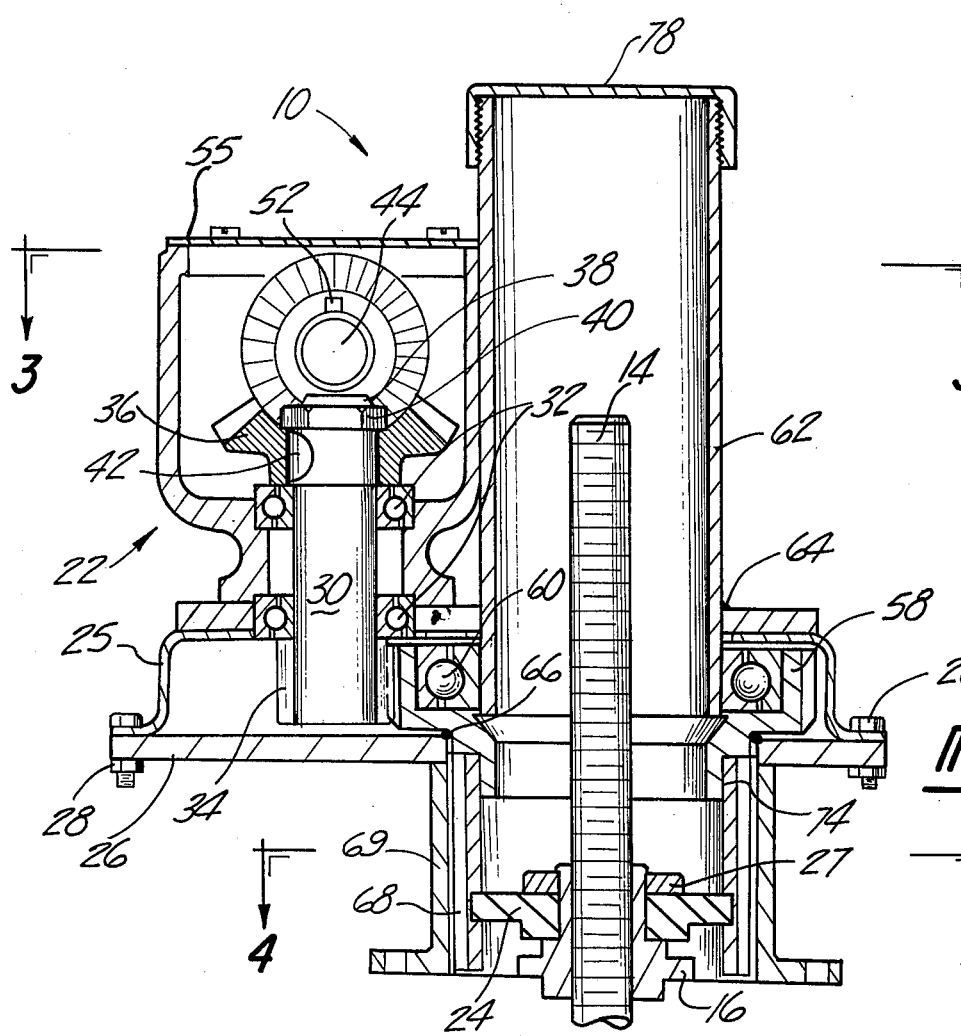
FIG. 2 is a cross-sectional view showing the valve actuator of the present invention.
Figure 3:
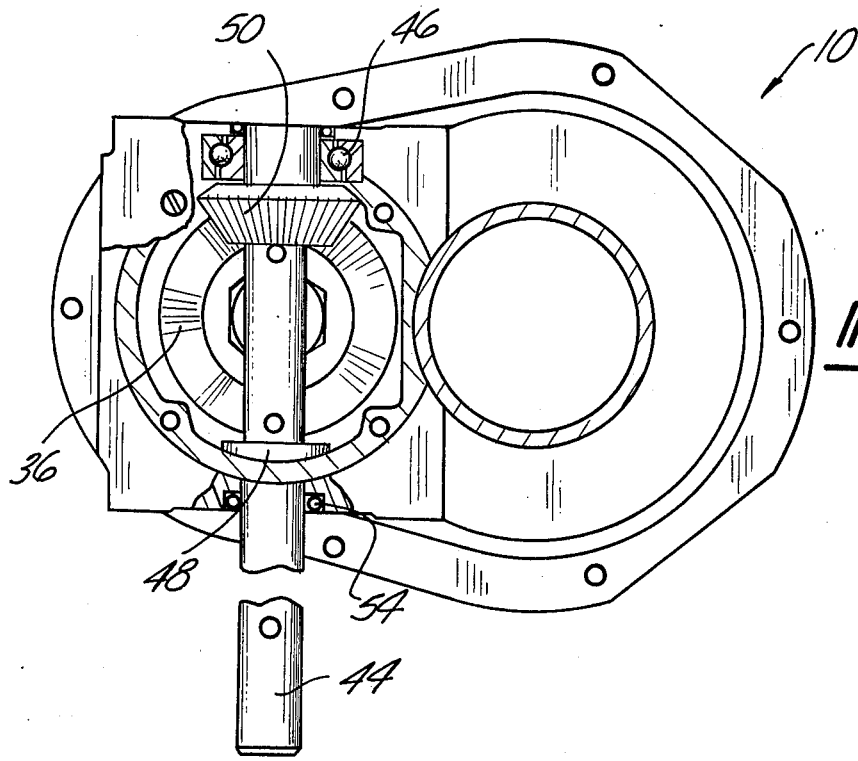
FIG. 3 is a cross-sectional view taken substantially along line 3—3 in FIG. 2.

Referring now to FIGS. 2 and 3, the actuator assembly 10 is shown comprising a valve actuator 22 in combination with a nut adapter 24 secured to the rotatable member 16 by a nut 27 and which will be described later in greater detail. The valve actuator 22 includes upper and lower housing portions 25 and 26, respectively, which are secured together by bolt and nut members 28. In the upper housing portion 25, a shaft 30 is rotatably mounted on bearings 32 so that the axis of rotation for the shaft 30 is generally parallel to, but offset from the axis of the valve stem 14.

A pinion 34 is secured to the lower depending end of the shaft 30 by any conventional means, while a first bevel gear 36 is positioned over the upper end of the shaft 30. The shaft 30 includes an upper threaded portion 38 which threadably receives a nut 40 thereon to secure the bevel gear 36 to the shaft 30. A Woodruff key 42 secures the bevel gear 36 against rotation with respect to the shaft 30.

A crankshaft 44 is rotatably supported by bearings 46 and 48 in the upper housing 25 so that the rotational axis of the crankshaft 44 intersects the axis of the shaft 30 at an angle generally perpendicular thereto. A second bevel gear 50 is carried by the crankshaft 44 and secured against rotation to the crankshaft 44 by way of, for example, a Woodruff key 52. The second bevel gear 50 is axially positioned on the crankshaft 44 so that the gear 50 meshes with the first bevel gear 36 and shims (not shown) may be utilized to properly position the bevel gears 50 and 36. Appropriate sealing means 54 are provided around the crankshaft 44 and likewise a cover plate 56 encloses the upper housing portion 25 to prevent foreign debris from entering the upper housing portion 25.

As thus far described, it should be apparent that rotation of the crankshaft 44 by a hand wheel 56 (See FIG. 1) or the like, causes the pinion 34 at the lower end of the shaft 30 to rotate. This rotation, in turn, is imparted to a drive gear 58 which is rotatably secured to a receiving tube 62 by a bearing member 60. The receiving tube 62 is in turn rigidly secured by welds 64 to the upper housing portion 25 so that the receiving tube 62 is coaxial with the valve stem 14 and is adapted to receive the valve stem 14 therethrough. Sealing means 66 are preferably provided between the lower housing portion 26 and the drive gear 58.

The rotation of the drive gear 58 is transmitted to the nut adapter 24, and hence the rotatable member 16, by means of a drive tube 68 enclosed within a tubular cylindrical portion 69 of the lower housing 26. A pair of diametrically opposed axial identations 70 are formed along the periphery of the drive tube 68 so that the indentations 70 project inwardly as can best be seen in FIG. 4. The cross-sectional shape of the indentations 70 is such that the indentations 70 are received through a pair of diametrically opposed axially extending grooves 72 formed along the periphery of the nut adapter 24 so that the drive tube 68 is rotatably coupled to the nut adapter 24. As is also best seen in FIG. 4, the diameter of the nut adapter 24 is substantially the same as the inside diameter of the drive tube 68 so that the nut adapter 24 snugly fits within the drive tube 68. A second pair of diametrically opposed axially extending grooves 74 are formed along the lower depending end of the drive gear 58. The drive tube indentations 70 are press fit within the grooves 74 to attach the drive tube 68 to the drive gear 58 so that rotation of the drive gear 58 is imparted to the drive tube 68. Also, although the indentations 70 need not extend along the entire length of the drive tube 68, in practice the construction illustrated in the drawing has proven to be the most economical.

In order to mount the valve actuator 22 on to the valve 12, a yoke adapter 80 is positioned on top of the yoke 20 and is secured thereto by welding or the like. The yoke adapter 80 includes an upperly facing mounting flange 82 which abuts against a mounting flange 84 on the cylindrical portion 69 of the lower housing portion 26. Registering apertures 88 are formed through the mounting flanges 82 and 84 so that fasteners 90 inserted through apertures 88 rigidly secure the valve actuator 22 to the yoke adaptor 80, and consequently, to the valve yoke 20.

The operation of the valve actuator assembly 10 of the present invention should by now be apparent and will therefore be described only briefly. Rotation of the crankshaft 44 by the hand wheel 56 rotates the shaft 30 through the bevel gears 50 and 36. The pinion 34 in turn imparts this rotation to the drive gear 58 and the rotation of the drive gear 58 is transmitted to the nut adapter 24 by the drive tube 68 via indentations 70. The nut adapter 24 is secured to the rotatable member 16, as has been previously described, so that rotation of the nut adapter 24 actuates the valve 12.

It can thus be seen that the valve actuator assembly 10 of the present invention provides a new and novel valve actuator which is particularly suited for valves having rising valve stems. Moreover, any number of extensions can be axially coupled to the receiving tube 62 to increase the axial length thereof in order to accommodate valve stems with large axial travel and a cap 78 is preferably provided over the uppermost extension of the receiving tube 62. More importantly, however, it should be apparent that the simple drive tube 68 provided between the drive gear 58 and the valve rotatable member 16 in combination with the nut adapter 24 provides a simple and inexpensive driving mechanism for the valve actuator thereby eliminating the previously known complex and expensive interdigital clutch mechanisms for valve actuators.

No unnecessary limitations, however, should be drawn from the above description of the invention. For example, the valve actuator assembly 10 of the present invention may be utilized in conjunction with any valve having a rotatable member 16 even though the valve is not of the rising stem variety.

Having described by invention many modifications thereto will become apparent to those skilled in the art to which it pertains without deviation from the spirit of the invention as defined by the scope of the appended claims.

What is claimed is:

1. A valve actuator for use in conjunction with a valve having rotatable member means and a valve stem wherein the rotation of said rotatable member means axially moves said valve stem to actuate the valve, said actuator comprising:
 a housing;

a drive tube rotatably carried by said housing and adapted to be disposed coaxially with and over said rotatable member means, said drive tube having an open end which is axially slidably received over said rotatable member means;

means for automatically rotatably drivingly connecting said drive tube and said rotatable member means as said drive tube is slidably positioned coaxially over said rotatable member means;

means for rotatably driving said drive tube; and a receiving tube extending upwardly from said drive tube and coaxial therewith to receive said stem.

2. The actuator as defined in claim 1 and in which said receiving tube is provided with an open end and means being formed at the open end of said receiving tube for receiving another tube.

3. The actuator as defined in claim 1 and in which said driving means comprises a first gear carried by said drive tube and a second gear engaging said first gear and axially parallel to, but offset from, said first gear.

4. A valve actuator for use in conjunction with a valve having a stem and a rotatable member, the rotation of said rotatable member axially moving said stem to actuate the valve, said actuator comprising:
   a housing;
   a nut adapter secured to said rotatable member, said nut adapter having at least one axial groove formed along its periphery;
   a drive tube rotatably carried by said housing and adapted to be disposed coaxially with and over said rotatable member so that said nut adapter is axially slidably received within one end of said drive tube, said drive tube including at least one axial inwardly projecting indentation formed along its periphery wherein said indentation is received within the peripheral groove on the nut adapter;
   means for rotatably driving said drive tube; and
   a receiving tube extending upwardly from said drive tube and coaxial therewith to receive said stem.

5. The actuator as defined in claim 4, wherein said last mentioned means is contained within a housing and further comprises:
   a drive gear secured around said drive tube and coaxial therewith;
   a shaft rotatably mounted in said housing and having its axis generally spaced and parallel to the drive tube axis;
   a pinion secured to said shaft in a meshing engagement with said drive gear;
   a first bevel gear secured to said shaft;
   a crankshaft rotatably mounted in said housing so that the axis of said crankshaft is generally perpendicular to said axis of said drive tube; and
   a second bevel gear secured to said crankshaft and in a meshing engagement with said first bevel gear so that rotation of said crankshaft imparts rotation to said drive tube.

6. The actuator as defined in claim 5 and in which said receiving tube is secured to said housing adjacent said drive tube and is coaxial therewith.

* * * * *